No. 625,600. Patented May 23, 1899.
E. C. POHLÉ.
DRIVING GEAR FOR BICYCLES.
(Application filed Jan. 8, 1898.)
(No Model.)
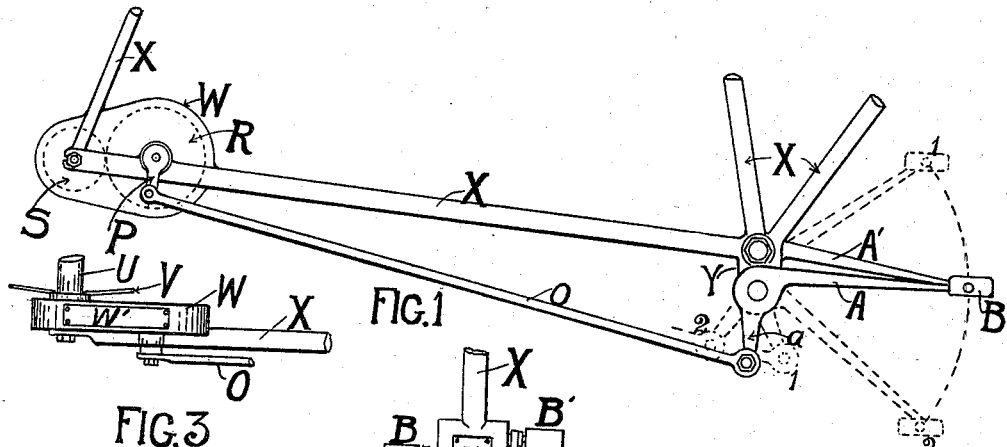
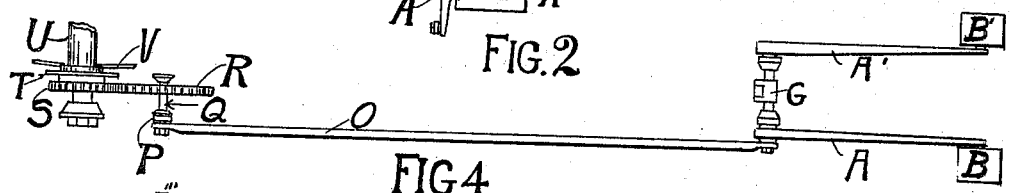
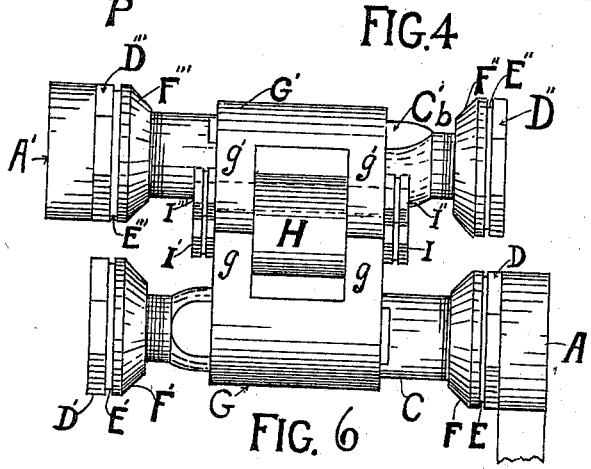
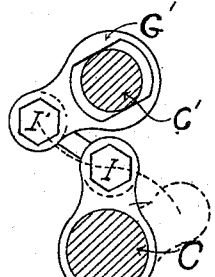
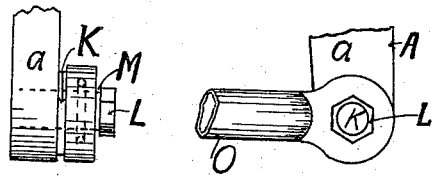
Witnesses
John P. Williams
M. S. Fallis
Inventor
Edwin C. Pohlé
THE NORRIS PETERS CO., PHOTO-LITHO., WASHINGTON, D. C.

UNITED STATES PATENT OFFICE.

EDWIN C. POHLÉ, OF DENVER, COLORADO.

DRIVING-GEAR FOR BICYCLES.

SPECIFICATION forming part of Letters Patent No. 625,600, dated May 23, 1899.

Application filed January 8, 1898. Serial No. 666,036. (No model.)

*To all whom it may concern:*

Be it known that I, EDWIN C. POHLÉ, a citizen of the United States, and a resident of Denver, in the county of Arapahoe and State of Colorado, have invented a new and useful Improvement in Bicycle Driving-Gears, of which the following is a specification.

My invention relates to the manner of transmitting the power from the place of application to the driving-wheel of the bicycle.

On bicycles previously invented and in general use the pedal upon which the driving power is applied revolves in a complete circle at the end of the crank, causing the foot or power application to traverse the entire circumference of a circle, while the effectual advance of the applied power is only equal to the diameter of the circle described—viz., the foot travels 3.1416 units of distance, while the effectual advance of the power applied is but one unit, resulting in a loss motion of 2.1416 units or 214.16 per cent. of the effectual motion. In my invention the pedals or power application advances through an arc of about sixty degrees and then returns, causing the pedals to traverse a total arc, equal to about one hundred and twenty degrees, while the effectual advance of power is equal to the chord of sixty degrees. Therefore the distance traversed by the pedal or application of power equals 2.0944 units, while the effectual advance of power equals one unit or a loss of 109.44 per cent of the effectual motion, showing about one-half as much loss motion as in the revolving pedals. This advantage has been employed before, but only with the impractical application of springs, &c., to cause the pedals to return, which have resulted in its non-use. I have given a reciprocating motion to the pedals by the introduction of a connection between the crank-shafts and by a pitman-rod connection with the driving-wheel, so that the power applied to one pedal advancing causes the other to return, or the momentum of the bicycle carries the pedals through this advancing and returning motion. This gives the operator complete control of the machine, so that power may be used either in driving or retarding it.

I have dispensed with the use of the troublesome chain by the introduction of a pitman or connecting rod, which has many advantages over other chainless wheels, especially in there being but one pair of direct gear-wheels instead of two pairs of angular gears, while I still provide a means of changing the distance advanced by the bicycle to each motion of the foot.

Having explained some of the advantages of my invention, I will now give a detail description of it, reference being had to the accompanying drawings.

In the different views the same letter refers to the same part.

On the drawings, Figure 1 is a side view showing the manner of connecting and attaching my invention and its mode of operation. Fig. 2 is a front view of the same. Fig. 3 is a horizontal plan showing the casement for the gearing in connection with the rear wheel of the machine. Fig. 4 is a horizontal plan of my invention, having the framework of the machine removed. Fig. 5 is a detail of the attachment which gives the reciprocating movement to the pedals, being a cross-section at *b b*. Fig. 6 is a front view of the same attachment. Fig. 7 is a front view of the connection of the pitman-rod to the lower arm of the pedal-crank, and Fig. 8 is a side view of the same.

A is the pedal-crank, having an arm *a* extending from the bearing at the required angle with the crank proper. A' is a crank on the opposite side of the machine, having no short arm, as *a*, upon it. The crank A extends upward slightly near the crank-shaft C, and the crank A' extends downward the same distance near the crank-shaft C'. This is to bring the two pedals B and B' to the same level, while the crank-shafts C and C' are not on the same level. The cranks A and A' are made rigid on the crank-shafts C and C', preferably by keys. The shafts C and C' have ball-bearings on either side, preferably by means of the cones F, F', F''', and F'''', which are secured rigidly to the shafts C and C' by means of the washers E E', &c., and the locknuts D D', &c. Between the bearings of the shaft is placed a short crank G and a similar crank G' on the shaft C'. These cranks G and G' are held rigid to their respective shafts, preferably by the shafts being flattened and the cranks to fit neatly to the flattened shafts.

The cranks G and G' have each two arms $g$ and $g'$, between which is placed the connecting-bar H, having ball-bearings between the bar H and the cranks $g$ and $g'$, preferably by cone-pointed plugs I I', &c., being threaded into the cranks $g$ and $g'$ and held rigid by means of the lock-nuts J.

The frame of the machine in which the shafts C and C' have their bearings is made in the usual form, but having provision for bearings for two shafts, preferably one above the other, substantially as shown. The cranks G and G' and their connecting-bar H are inclosed in the frame. In front of the cranks G and G' is an opening in the frame closed by the plate Z.

To the lower arm $a$ of the crank A is attached the pitman-rod O, having a ball-bearing connection, preferably as shown, K being a pin threaded into the arm $a$, forming a cone, as shown, having the cone M and lock-nut L threaded on the pin K. The inner bearing of the rod O where it comes in connection with the pin K and cone M is grooved substantially as shown. The other end of the rod O is connected to the short crank P in a manner similar to that just described. The crank P is made rigid upon the shaft Q which has ball-bearings. Upon the shaft Q is fixed rigidly the gear-wheel R. The gear-wheel R meshes into the gear-wheel S. The gear-wheel S is fixed to the wheel of the machine in a manner similar to the usual method of securing the rear sprocket-wheel in a chain-driving bicycle. The two gear-wheels R and S are inclosed in a dust-proof casement W, with an opening on top covered with the plate W' and an opening in the side covered by the plate T, which revolves with the driving-wheel of the machine.

U indicates the hub of the driving-wheel of the machine, and X X' X", &c., indicate the frame of the machine.

The motion of the pedal B is from about the point 1 to 2, while the pedal B' moves from 2 to 1, and vice versa. The pedals moving the above distances by the connecting-rod O cause the crank P and the gear-wheel R to revolve continuously. The wheel R by its contact with the wheel S, which is attached to the wheel of the machine, causes this wheel to revolve and the machine to advance.

Having now described my invention, what I claim as new and useful is—

In a bicycle, the combination with the driving-shafts mounted in separate bearings, of an arm rigidly held on each shaft, the arm on one shaft extending toward the other shaft, a link pivoted to the said arms, whereby said shafts will rock in opposite directions, and gearing operatively connecting one of said driving-shafts with a traveling wheel, as and for the purpose set forth.

ED. C. POHLÉ.

Witnesses:
  JNO. S. WILLIAMS,
  M. S. FALLIS.